US006067700A

United States Patent [19]

Tang et al.

[11] Patent Number: 6,067,700

[45] Date of Patent: May 30, 2000

[54] PRESTRESSED COMPRESSOR MOUNT INSTALLATION METHODS

[75] Inventors: Punan Tang, Fort Smith; Kenneth R. Swift, Jr., Booneville; Ronald J. Rasmussen, Greenwood, all of Ak.

[73] Assignee: Rheem Manufacturing, Company, New York, N.Y.

[21] Appl. No.: 09/076,323

[22] Filed: May 11, 1998

Related U.S. Application Data

[63] Continuation-in-part of application No. 08/881,673, Jun. 24, 1992, Pat. No. 5,964,579.

[51] Int. Cl.[7] .................................................. B23P 11/02

[52] U.S. Cl. .............................. 29/450; 29/235; 81/300

[58] Field of Search ...................... 29/450, 235; 81/300

[56] References Cited

U.S. PATENT DOCUMENTS

| | | | |
|---|---|---|---|
| 2,466,952 | 4/1949 | Jabukowski | 29/235 |
| 2,468,286 | 4/1949 | Behlert | 29/235 |
| 2,551,514 | 5/1951 | Truelove et al. | 62/116 |
| 2,657,818 | 11/1953 | Mueller | 29/235 |
| 2,685,178 | 8/1954 | Eck | 62/115 |
| 2,759,255 | 8/1956 | Prince | 29/450 |
| 2,961,755 | 11/1960 | Prince | 29/235 |
| 3,350,767 | 11/1967 | Yannuzzi | 29/235 |
| 3,455,011 | 7/1969 | Harding | 29/235 |
| 3,785,167 | 1/1974 | Sahs | 62/296 |
| 4,497,183 | 2/1985 | Gelbard et al. | 62/295 |
| 4,696,089 | 9/1987 | Gjesdal | 29/451 |
| 4,711,423 | 12/1987 | Popper | 248/635 |
| 4,782,573 | 11/1988 | Le Floch | 29/235 |
| 5,040,953 | 8/1991 | Tinsler | 417/363 |
| 5,090,115 | 2/1992 | Fuller et al. | 29/789 |
| 5,221,192 | 6/1993 | Heflin et al. | 417/363 |
| 5,277,554 | 1/1994 | Elson | 417/363 |
| 5,313,806 | 5/1994 | Feng | 62/295 |

FOREIGN PATENT DOCUMENTS

| | | |
|---|---|---|
| 172897 | 4/1976 | New Zealand . |

*Primary Examiner*—P. W. Echols
*Assistant Examiner*—John C. Hong
*Attorney, Agent, or Firm*—Konneker & Smith, P.C.

[57] ABSTRACT

An elastomeric compressor mount has a hollow convex cylindrical head portion which must be passed upwardly through a substantially smaller diameter circular opening in a support foot portion of the compressor. To facilitate the passage of the mount head portion through the support foot opening a specially designed clamping tool is provided which has an arcuate support portion and a clamping portion that may be pivoted toward and away from a concave side surface of the support portion. With these two tool portions pivoted toward each other they are inserted downwardly through the compressor foot opening, opened, and then clamped exteriorly onto the mount head portion in a manner deforming it to a generally U-shaped configuration as viewed along the axis of the mount. The deformed mount head portion, and the still clamped together tool portions are then pulled upwardly through the compressor foot opening, the free ends of the deformed, generally U-shaped mount head portion being pushed toward one another by side edge portions of the foot opening as the head portion passes upwardly through the opening. After the deformed mount head portion is positioned above the top side of the compressor foot, the tool is released to permit the mount head portion to spring back to its original annular configuration and overlie an annular top side surface portion of the compressor foot.

9 Claims, 7 Drawing Sheets

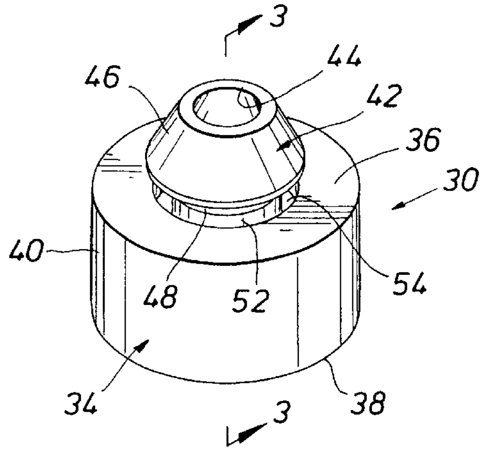
FIG. 2
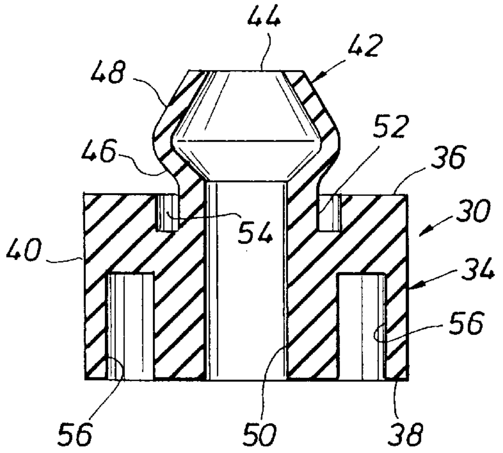
FIG. 3
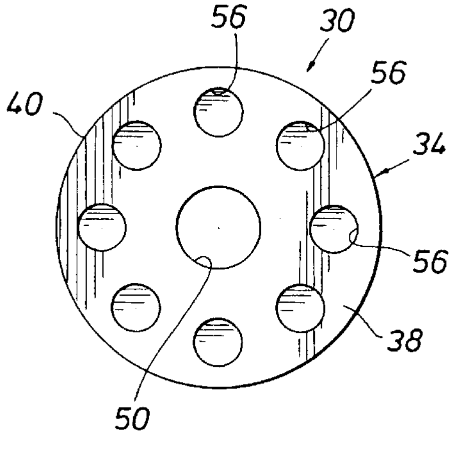
FIG. 4
FIG. 5
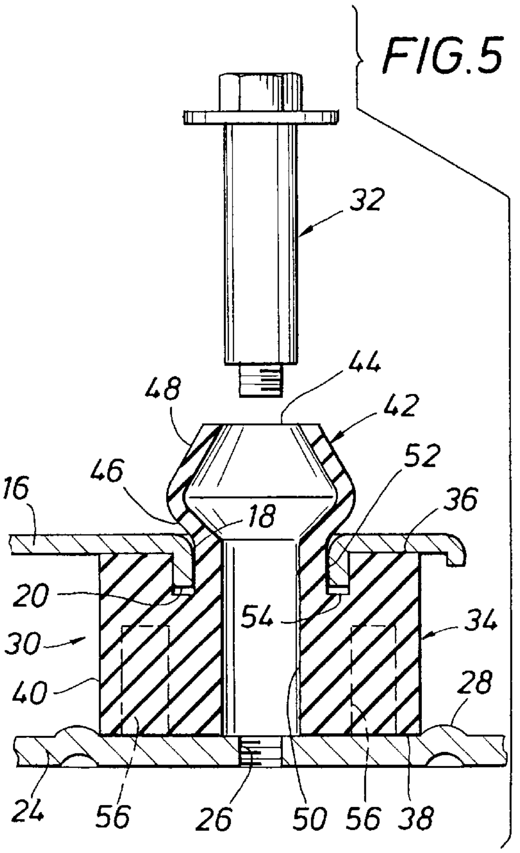
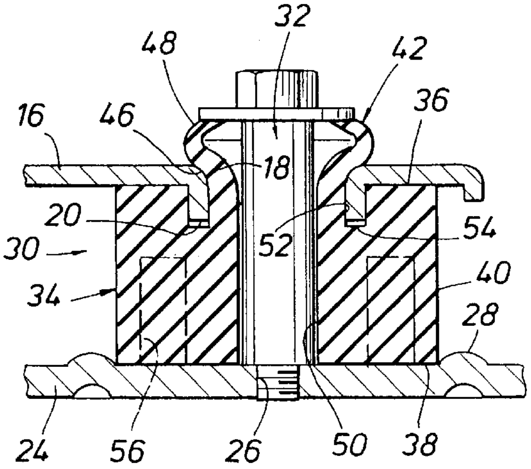
FIG. 6

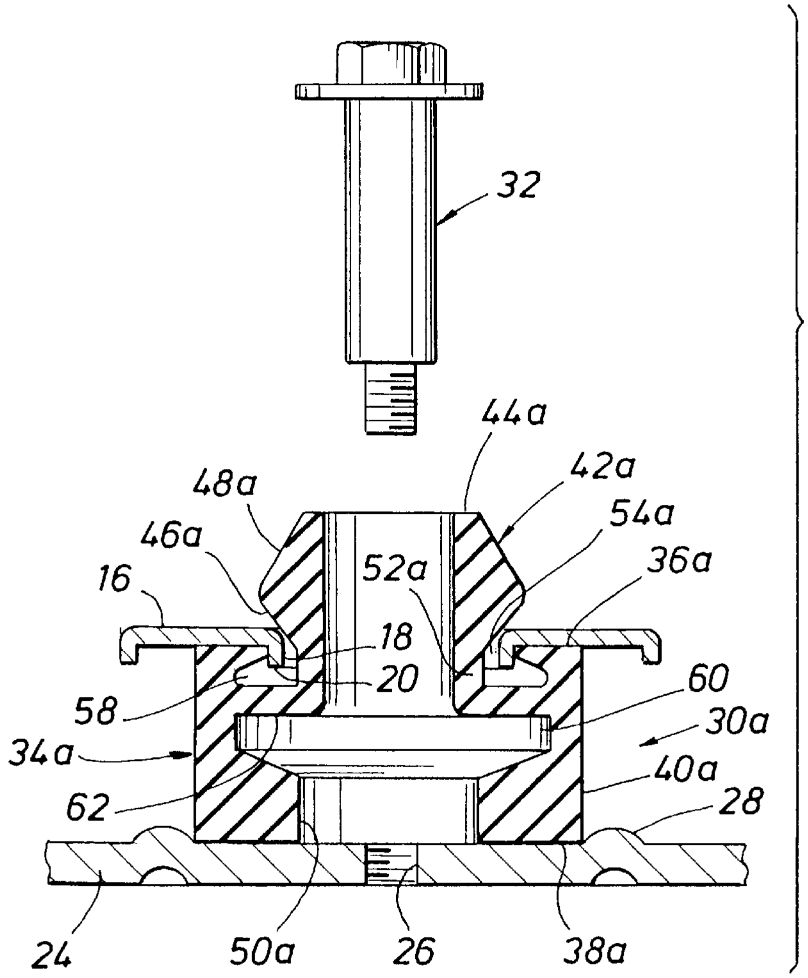
FIG. 7
FIG. 8
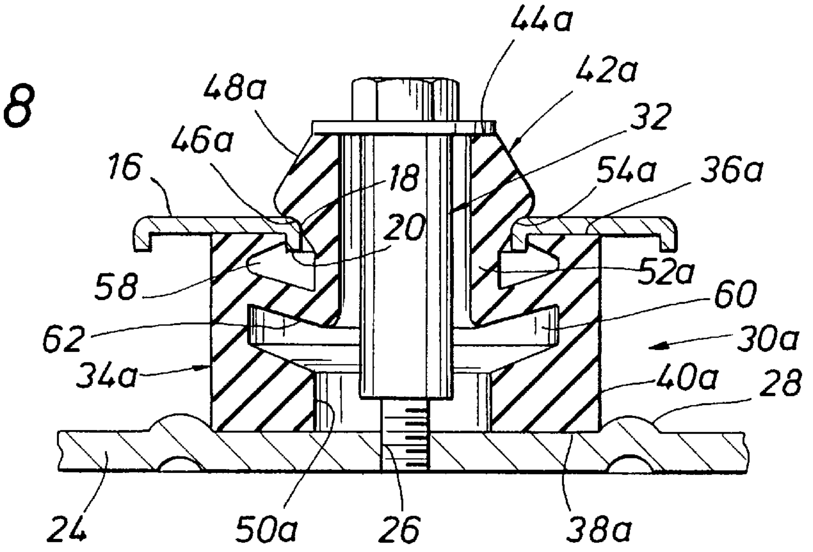

PRESTRESSED COMPRESSOR MOUNT INSTALLATION METHODS

CROSS-REFERENCE TO RELATED APPLICATION

This is a CIP of application Ser. No. 08/881,673 filed Jun. 24, 1992, now U.S. Pat. No. 5,964,579.

BACKGROUND OF THE INVENTION

The present invention generally relates to apparatus and methods for resiliently mounting vibration-prone machinery and, in a preferred embodiment thereof, more particularly relates to installation of elastomeric mounting members used to provide vibration absorbing support for the mounting feet portions of a compressor.

Mechanical compressors used, for example, in air conditioning and heat pump systems typically generate a considerable amount of vibration during their operation. In an attempt to isolate the equipment to which the compressor is connected, small resilient devices typically referred to as compressor mounts are used and are operatively interposed between mounting feet portion of the compressor and a support structure, such as a base pan, which underlies the compressor.

In common with various other types of machinery, a mechanical compressor will vibrate and radiate sound when it is excited by an external dynamic force. The radiated sound pressure level is governed by two major factors—the excitation force magnitude and frequency characteristics and the compressor's dynamic characteristics. Accordingly, structural vibration can be reduced by either external dynamic force isolation, structural modification, or both. A structural modification of the compressor to diminish its vibration forces is typically quite complex, and thus undesirable, due to the multi-frequency and multi-directional excitation forces to which the compressor is normally subjected. Accordingly, due to their simplicity and cost effectiveness, elastomeric compressor mounts are widely employed to isolate the compressor's vibration energy from the support structure.

A compressor's natural rigid modes consist of the six degree of freedom motions (three translation motions, two rotating motions, and one torsional motion), but its internal excitations may be limited to only several directions which are dependent on the compressor type. An isolator can be designed to accommodate the forced excitation direction and frequency. For example, a vibration isolation mount designed to isolate translation excitation may not affect rotational excitation isolation, and may not attenuate the overall operation sound level of the compressor.

It is difficult to design a compressor mount to handle all vibration isolation applications because such design would require that the compressor mount and the piping attached to the compressor have a high degree of flexibility in all six directions. And, if this design was incorporated, the compressor assembly would be unstable, undesirably resulting in large deformations of the compressor assembly, damaged piping, stripped compressor bolts and the like. From a practical standpoint, a satisfactory compressor mount would have sound reduction capabilities in addition to having enough stiffness to maintain small start-up tubing stress, system anti-shock capabilities and compressor assembly reliability.

A conventionally configured elastomeric compressor mount typically has a lower cylindrical base portion which rests on a base pan member, and a smaller diameter head portion projecting upwardly from the base portion, with an annular groove formed generally at the juncture of the base and head portions of the mount. A connection bolt through-hole extends axially through the mount. To support a compressor foot on a conventional elastomeric mount of this general type the mount base portion is placed on the top side of a base pan structure, the mount head portion is passed upwardly through a circular mounting hole in the compressor foot, and an annular bottom side flange on the compressor foot is forced into the annular groove in the mount. A mounting bolt is then extended downwardly through the mount through-hole and threaded into the underlying base pan structure to hold the mount and the associated compressor foot in place.

The mount head portion has a cylindrical upper end portion with a diameter larger than that of the compressor foot hole through which the cylindrical upper end portion of the mount head must be passed. Accordingly, when the compressor foot is operatively placed on the underlying mount base portion, the cylindrical upper end portion of the mount head horizontally overlaps an annular area of the compressor foot surrounding its mounting hole, thereby captively retaining the foot against upward removal thereof from the mount.

Two primary problems have typically been associated with conventional elastomeric compressor mounts of the type generally described above. First, their configurations tend to make them difficult to install on compressor mounting feet since a considerable amount of force is typically required to push the mount head portion upwardly through the mounting hole in the compressor foot. Second, because of their configurations it is often difficult to tighten the mounts onto their captively retained compressor feet in a manner suitably restraining the compressor feet against vertical movement relative to the mounts. This permits the compressor to undesirably "rock" on its underlying mounts in a manner transmitting a substantial amount of operational vibration load to the refrigerant tubing attached to the compressor, as well as to other portions of the air conditioning or heat pump system.

In some previously utilized mounts a vertical gap is intentionally provided between the top side of the installed compressor foot and the underside of the mount head portion to make it easier to place the annular underside flange of the compressor foot into the annular mount groove. While this makes the placement of the compressor feet on their associated elastomeric mounts easier, it also permits the mount-supported compressor even more freedom to rock on the mounts and potentially damage other portions of the overall air conditioning or heat pump system with which the compressor is associated.

In two embodiments thereof illustrated and described in copending U.S. application Ser. No. 08/881,673, (now U.S. Pat. No. 5,964,579) a resilient compressor mount is provided with a relatively thin-walled hollow convex cylindrical head portion having an upper end diameter smaller than that of the compressor foot hole, and a vertically intermediate portion having a maximum diameter substantially greater than the foot hole diameter—representatively about 1.5 times greater. This specially designed mount head portion configuration axially weakens the installed head portion in a manner permitting it to be resiliently squeezed downwardly against the top side of the mounting foot by the overlying head section of the mounting bolt. The resulting vertical deformation and compression of the mount head portion adds desirable axial and horizontal stiffness to the compressor and mount system and provides a substantially linear elastic damping system which enhances the stability of the overall apparatus and resiliently inhibits rocking of the compressor about horizontal axes.

The relatively thin-walled configuration of the convex cylindrical mount member head portion compared to conventionally configured resilient compressor mount head portions permits it to be laterally deformed, to permit its installation passage through its associated compressor foot opening, with somewhat less force. However, due to the fact that the maximum outer diameter of the head portion is about 1.5 times the diameter of the circular mounting foot opening through which it must pass, this necessary lateral deformation tends to be a relatively awkward task using conventional mount installation tools and techniques.

A need thus exists for improved installation apparatus and methods for operatively attaching a resilient compressor mount, of the types generally described above, to an associated compressor foot portion. It is to this need that the present invention is directed.

SUMMARY OF THE INVENTION

In carrying out principles of the present invention, in accordance with a preferred embodiment thereof, a specially designed tool is provided for facilitating the installation movement of an annular head portion of a resilient mount member, such as a compressor mount, through a circular hole disposed in an equipment base structure, such as a compressor foot, having a diameter less than that of the head portion.

From a broad perspective, the tool comprises first and second intersecured portions that may be selectively moved toward and away from one another, and a clamping portion extendable through the circular hole. The clamping portion is secured to the first and second tool portions and is selectively operable thereby to releasably engage circumferentially spaced apart first and second exterior side surface portions of the annular mount member head portion and squeeze them toward one another in a manner laterally deforming the head portion to a generally U-shaped configuration to facilitate its movement by the clamping portion through the circular hole.

The clamping portion of the tool preferably includes first and second pivotally intersecured parts, the first part having a concavely arcuate side surface positionable against a circumferentially extending first outer side surface portion of the mount member head portion, and the second part being supported for selected movement toward and away from the arcuate side surface between a clamping position and a release position.

In the clamping position, the second part is adjacent the arcuate side surface and is positioned to pass through the circular hole with the first part of the clamping portion. In the release position the second part is moved away from the arcuate side surface to permit the mount member head portion to be position between the arcuate side surface and the second part, with the arcuate side surface facing the first outer side surface portion, and the second part positioned outwardly adjacent a second outer side surface portion of the mount member head portion circumferentially spaced apart from the first outer side surface portion thereof.

The second clamping portion part, when moved from the release position to the clamping position with the mount head portion disposed between the arcuate side surface and the second clamping portion part, is cooperable with the arcuate side surface to squeeze the mount head portion therebetween and resiliently deform it laterally to a generally U-shaped configuration to facilitate its passage through the circular hole with the first and second clamping portion parts.

In a preferred method of the invention, the mount head portion has a convex annular configuration, and preferably also has a uniform wall thickness, and the clamping portion of the tool is moved to its clamping position and passed in a first direction through the circular hole. The clamping portion is then opened to its release position, placed over opposite exterior side portions of the mount head and forced back to its clamping position to laterally deform the mount head to the aforementioned generally U-shaped configuration thereof. The clamping portion of the tool is then pulled back through the circular hole, with the deformed mount portion still being clamped by the tool, and then moved to its release position to permit the mount head to spring back to its original undeformed configuration.

In a preferred constructional embodiment thereof, the tool comprises a hollow tubular first member having a front end portion and opposite top and bottom side portions, the front end portion having a circumferential portion thereof removed to expose a concavely arcuate inner side surface section. A depending handle is generally transversely secured to he first member rearwardly of its front end portion.

An elongated second member longitudinally extends through the top and bottom side portions of the first member forwardly of the handle, and is pivotally secured to the first member. The second member has a clamping portion disposed generally above the concavely arcuate inner side surface section, and a trigger portion pivotally movable toward and away from the handle to respectively pivot the clamping portion toward and away from the concavely arcuate inner side surface section. A spring structure interconnected between the first and second members resiliently biases the trigger portion pivotally away from the handle.

To use the tool, the trigger is squeezed and the front end of the first member and the clamping portion of the second member are pushed through the circular hole. The trigger is then released and the mount head is placed between the arcuate side surface section and the clamping portion of the second member. Next, the trigger is squeezed again to laterally deform the mount head to a generally U-shaped configuration, and deformed mount head is pulled through the circular hole. The trigger is then released to disengage the tool from the mount head and permit the released mount head to laterally spring back to its previous undeformed configuration.

BRIEF DESCRIPTION OF THE DRAWINGS

FIG. 2 is an enlarged scale perspective view of one of the compressor mounts;

FIG. 3 is an enlarged scale cross-sectional view through the compressor mount taken along line 3—3 of FIG. 2;

FIG. 4 is an enlarged scale bottom plan view of the compressor mount;

FIGS. 5 and 6 are enlarged scale partially elevational cross-sectional views of the compressor mount sequentially illustrating its operative interconnection between a compressor foot and the base pan structure;

FIGS. 7 and 8 are partially elevational cross-sectional views through an alternate embodiment of the compressor mount and sequentially illustrate its operative interconnection between a compressor foot and the base pan structure;

DETAILED DESCRIPTION

Figure 1:
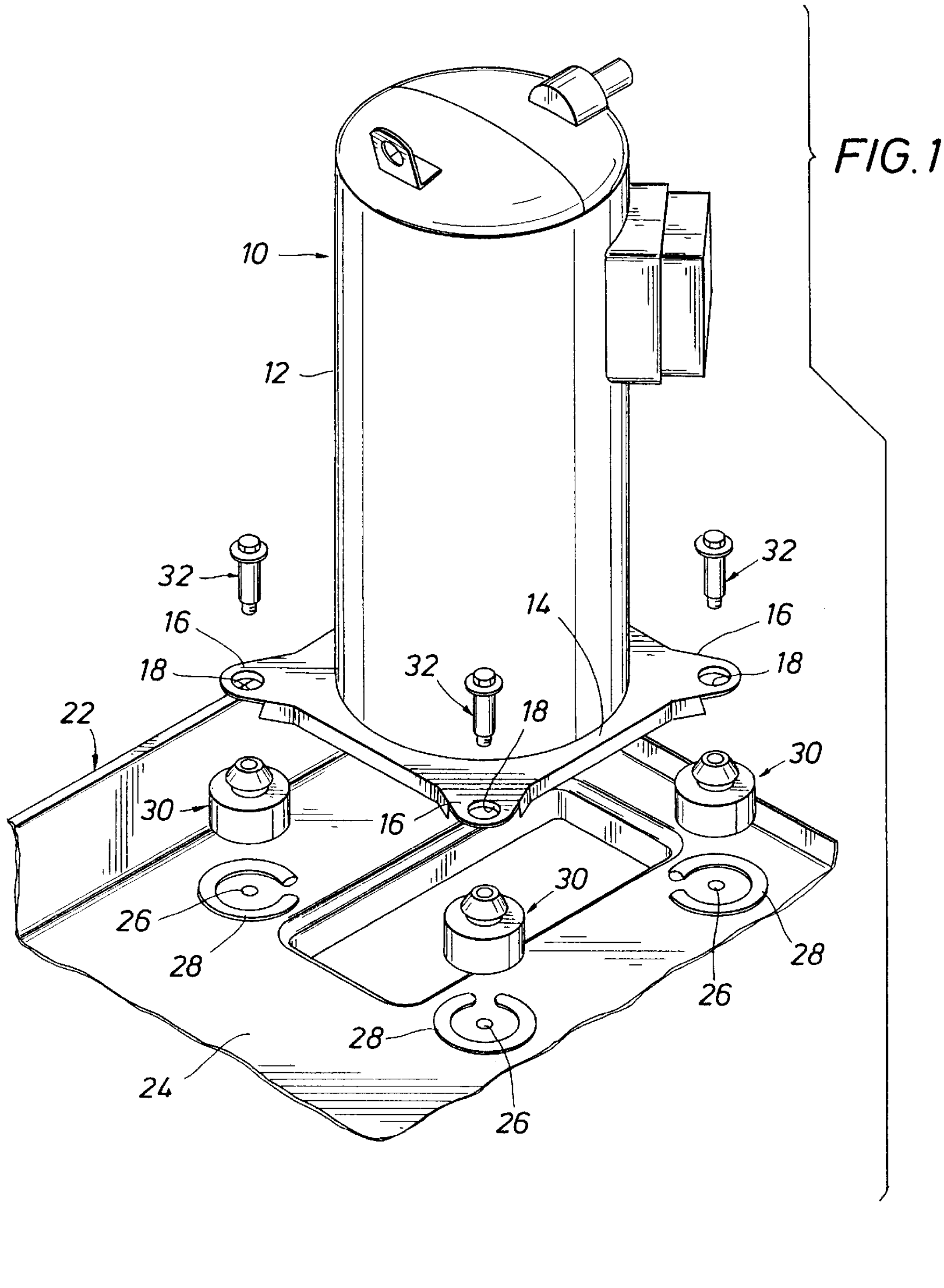
FIG. 1 is an exploded perspective view of a representative air conditioning or heat pump system compressor which is operatively mounted on a base pan structure using specially designed resilient compressor mounts embodying principles of the present invention.
Figure 9:
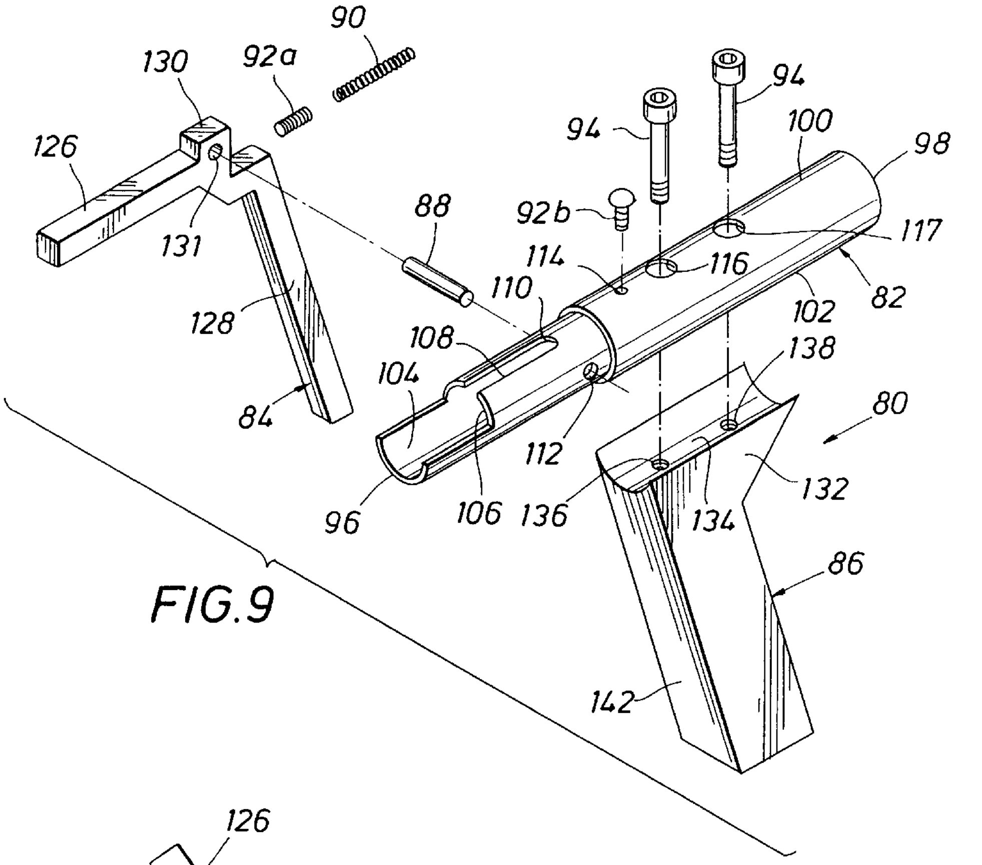
FIG. 9 is an exploded perspective view of a specially designed clamping tool embodying principles of the present invention and used to install one of the resilient compressor mounts.

Perspectively illustrated in exploded form in FIG. 1 is a representative mechanical compressor 10 used in, for example, an air conditioning or heat pump system and being operatively connected to associated refrigerant tubing (not shown) in a conventional manner. Compressor 10 has a vertically oriented cylindrical body portion 12 at the bottom of which a generally rectangular support structure 14 is secured. The support structure 14 has, at each of its four corners, an outwardly projecting foot portion 16 (only three of the compressor feet being visible in FIG. 1) having a circular opening 18 formed therein. Each opening 18 is circumscribed by an annular flange 20 (see FIG. 5) depending from the bottom side of the foot 16. A base pan structure 22 having a bottom wall 24 underlies the compressor 10, the bottom wall 24 having four mounting holes 26 which are horizontally alignable with the compressor foot openings 18 and are outwardly ringed by arcuate guide embossments 28 formed on the top side of the bottom base pan wall 24.

Compressor 10 is resiliently supported atop the bottom base pan wall 24 by four specially designed vibration attenuating resilient compressor mounts 30 (only three of which are visible in FIG. 1) which embody principles of the present invention and are interposed between the compressor feet 16 and the bottom base pan wall 24, and secured thereto by vertical bolts 32, in a manner subsequently described herein. Preferably, the mounts 30 are molded as one piece structures from a suitable elastomeric material.

Turning now to FIGS. 2–4, each mount 30 has a cylindrical lower base portion 34 with an annular top end 36, an annular bottom end 38, and an annular vertical outer side 40. Projecting axially upwardly beyond the top end wall 36 is a hollow convex cylindrical head portion 42 of the mount 30 which has an open upper end 44, an upwardly and radially outwardly sloped bottom side wall 46, and an upwardly and radially inwardly sloped top side wall 48. An axially extending circularly cross-sectioned tightening opening 50 passes upwardly through the bottom base portion end 38 into the head portion interior which forms a laterally enlarged upward extension of the tightening opening.

The mount head portion 42 has a substantially uniform wall thickness, and is joined at its bottom end to the top end of the mount base portion 34 by an annular intermediate section 52 of the mount which is outwardly circumscribed by an annular groove 54 formed in the top base portion end wall 36 and underlying the sloping bottom side wall 46 of the mount head portion 42. Preferably, the diameter of the convex cylindrical mount head portion 42 at its upper end is less than the diameter of each support foot opening 18, while the maximum diameter of the head portion 42 is approximately 1.5 times the support foot opening diameter.

As best illustrated in FIGS. 3 and 4, a circumferentially spaced series of circularly cross-sectioned holes 56 surround the tightening hole 50 and extend upwardly through the bottom end 38 of the mount base portion 34. These holes serve to facilitate the mount molding process by maintaining a generally uniform elastomeric material thickness in the base 34, thereby maintaining a generally uniform thermal stress during molding, and additionally reducing the material cost of the mount.

Each compressor foot 16 is operatively installed on the bottom base pan wall 24, in an upwardly spaced relationship therewith, using one of the vibration attenuating elastomeric mounts 30 in a manner which will now be described in conjunction with FIGS. 5 and 6. The hollow, convex cylindrical head portion 42 of each mount 30 is laterally deformed, in a unique manner later described herein, and then passed upwardly through its associated foot opening 18 in a manner causing the bottom side of the foot 16 to downwardly engage the top end 36 of the mount base portion, and the depending annular flange portion 20 of the foot to enter the annular mount groove 54. The laterally deformed head portion 42 is then allowed to spring back to its original shape, as shown in FIG. 5, in which the radially enlarged axially central portion of the head 42 outwardly overlies a corresponding annular portion of the compressor foot 16.

The bottom end 38 of each mount 30 is placed on the top side of the bottom base pan wall 24, within one of the arcuate embossments 28 thereon, and one of the bolts 32 is axially extended downwardly through the mount 30 and threaded into the underlying base pan mounting hole 26 as illustrated in FIG. 6. The cylindrical body portion of each bolt 32 is shorter than the total undeformed height of its associated elastomeric mount. Thus, when the bolt is tightened into the base pan wall 24 the enlarged head portion of the bolt moves the hollow convex cylindrical mount head portion 42 toward the upper end 36 of the mount base portion 34 by axially compressing the head portion 42, while at the same time radially outwardly deforming it. This, in turn, resiliently squeezes an annular portion of the compressor foot 16 outwardly adjacent the foot opening 18 between the bottom side surface 46 of the deformed mount head portion 42 and the top end 36 of the mount base portion 34 as shown in FIG. 6.

The unique configuration of each elastomeric compressor mount 30 provides it with several advantages over conventionally configured mounts used in this particular application. For example, the mount 30 is considerably easier to install on its associated compressor foot 16 due to the hollow, thin-walled head portion 42 of the mount which may be easily compressed in a lateral (i.e., horizontal) direction to facilitate its upward passage through the mounting hole 18 in the foot 16. Additionally, the upward and radially outward slope of the bottom side wall 46 of the mount head portion 42 provides an enlarged entrance area for the underlying annular groove 54 to make it easier to insert the depending compressor foot flange 20 into the groove.

Moreover, the provision of the hollow convex cylindrical head portion 42 on the mount 30 axially weakens it in a manner permitting the head portion 42 to be moved downwardly toward the mount base portion 34 (as may be seen by comparing FIGS. 5 and 6), to resiliently squeeze an annular portion of the installed compressor foot 16 between the bottom side wall 46 of the mount 30 and the upper end 36 of the mount base portion 34, without creating a substantial compressive force in the annular intermediate section 52 of the mount. With the mount head portion 42 laterally deformed and pressed down onto the compressor foot 16 in this manner, the mount 30 adds axial and horizontal stiffness to the compressor and mount system and provides a substantially linear elastic damping system which enhances the stability of the overall apparatus and resiliently inhibits rocking of the compressor 10 about horizontal axes.

An alternate embodiment 30*a* of the previously described elastomeric compressor mount 30 is cross-sectionally illustrated in FIGS. 7 and 8. For ease in comparison, features and components in the mount 30*a* similar to those in the mount 30 have been given identical reference numerals having the subscript "a".

The elastomeric mount 30*a* has a cylindrical lower base portion 34*a* with an annular top end 36*a*, an annular bottom end 38*a*, and an annular vertical outer side 40*a*. Projecting axially upwardly beyond the top end wall 36*a* is a hollow convex cylindrical head portion 42*a* of the mount 30*a* which has an open upper end 44*a*, an upwardly and radially outwardly sloped bottom side wall 46*a*, and an upwardly and radially inwardly sloped top side wall 48*a*. An axially extending circularly cross-sectioned tightening opening 50*a* passes upwardly through the bottom base portion end 38*a* into the head portion interior which forms a radially reduced, circularly cross-sectioned upward extension of the tightening opening 50*a*. Unlike the previously described mount head portion 42, the head portion 42*a* has a nonuniform wall thickness as cross-sectionally illustrated in FIGS. 7 and 8.

An enlarged diameter annular groove 58 is interiorly formed within the mount base portion 34*a* and forms a downward continuation of the smaller diameter annular groove 54*a* at the top end of the base portion 34*a*. A vertically thicker annular groove 60 is formed in the interior side surface of the mount base portion 34*a* and is spaced downwardly apart from the annular groove 58. Positioned between the annular grooves 58 and 60 within the mount base portion 34*a* is an annular internal flange portion 62 of the mount 30*a*. As illustrated in FIGS. 7 and 8 the annular intermediate mount section 52*a*, to which the head portion 42*a* is attached, extends upwardly from a central annular portion of the internal flange 62.

To install the mount 30*a*, its convex cylindrical head portion 42*a* is laterally deformed, in a unique manner subsequently described herein, and passed upwardly through the hole 18 in the compressor foot 16 and then allowed to snap back to its original undeformed configuration, and the bottom end 38*a* of the mount base portion 34*a* is placed on the base pan wall 24, within the arcuate embossment 28, as shown in FIG. 7. Next, as indicated in FIG. 8, the bolt 32 is extended downwardly through the tightening opening 50*a* in the mount 30*a* and threaded into the base pan opening 26. This forces the mount head portion 34*a* downwardly toward the upper end 36*a* of mount base portion 34*a*, thereby downwardly deflecting the annular internal flange 62 and resiliently squeezing an annular portion of the compressor foot 16 circumscribing its mounting opening 18 between the bottom side 46*a* of the mount head portion 42*a* and the top end 36*a* of the mount base portion 34*a* as cross-sectionally illustrated in FIG. 8.

The connection of the intermediate mount section 52*a* to the resiliently and downwardly deflectable annular internal flange 62 thus axially weakens the mount 30*a* in a manner permitting the annular compressor foot portion to be resiliently squeezed between the mount base and head portions 34*a*,42*a* without imposing a substantial amount of compressive force on the annular intermediate section 52*a* of the mount 30*a*.

While the elastomeric mounts 30 and 30*a* have been illustrated as being representatively installed on a compressor in an air conditioning or heat pump system, it will be readily appreciated by those of skill in this particular art that they could also be advantageously utilized in conjunction with many other types of vibration-prone machinery in other types of mechanical systems.

As previously discussed herein, the unique convex cylindrical configurations of each of the head portions 42,42*a* of the compressor mounts 30 and 30*a*, and their laterally overlying installed relationships with the top side of their associated compressor foot 16, permits the head portion to be vertically deformed and squeezed against the top side of its associated mounting foot 16. This, in turn adds axial and horizontal stiffness to the compressor and mount system and provides a substantially linear elastic damping system that enhances the stability of the overall apparatus and resiliently inhibits the rocking of the compressor 10 about horizontal axes.

The relatively thin-walled configurations of the convex cylindrical mount member head portions 42 and 42*a* compared to conventionally configured resilient compressor mount head portions permits them to be laterally deformed, to permit their installation passage through one of the compressor foot openings 18, with somewhat less force. However, due to the fact that the maximum outer diameter of each head portion 42,42*a* is representatively about 1.5 times the diameter of each circular mounting foot opening 18, this necessary lateral deformation tends to be a relatively awkward task using conventional mount installation tools and techniques.

Referring initially to FIGS. 9–13, this installation problem is substantially alleviated using a specially designed installation clamping tool 80 embodying principles of the present invention. As perspectively illustrated in exploded form in FIG. 9, the tool 80 comprises a hollow tubular body 82; a generally L-shaped clamping bar member 84 having a rectangular cross-section along its length; a handle 86; a cylindrical pivot dowel 88; a coiled compression spring member 90; two all-thread screws 92*a* and 92*b*; and two Allen screws 94.

The hollow tubular body 82 has a front end 96, a rear end 98, a top side 100, and a bottom side 102. A front end portion of the body 82 has a top side section removed therefrom in a manner leaving an arcuate, upwardly concave front end portion 104 circumferentially extending through a somewhat greater than semicircular arc. The outer diameter of the body 82 is somewhat less than the diameter of the holes 18 in the compressor mounting feet 16 (see FIG. 1). Above the rear or inner end of the front end portion 104 is an upwardly curved ledge 106. Axially extending rearwardly from the ledge 106 through a top side portion of the body 82 is a slot 108 having a curved rear end surface 110 positioned slightly forwardly of a diametrically opposed pair of circular dowel holes 112 extending through left and right side portions of the body 82. To the rear of the top side slot 108 a small diameter circular hole 114, and a pair of larger diameter circular holes 116,117 extend through the top side 100 of the tubular body 82.

An axially extending slot 118 (see FIG. 13) is formed in the bottom side 102 of the tubular body 82. The slot 118 has curved front and rear ends 120,122 and is spaced slightly forwardly of a circular hole 124 that is formed in the bottom side 102 of the body 82, underlies the hole 117 in the top side 100 of the body 82, and has a diameter smaller than that of the hole 117.

The clamping bar member 84 is of a generally L-shaped configuration and has an elongated clamping arm portion 126, an elongated trigger arm portion 128, and a generally rectangular mounting block portion 130 positioned adjacent the juncture of the arms 126,128 and having a circular dowel opening 131 extending therethrough. Illustratively, the clamping bar member 84 has a rectangular cross-section along its length and, like the tubular body 82, is representatively formed from a metal material.

Handle 86 is representatively formed from a suitable plastic material, and has a vertically elongated rectangular configuration with a top end portion 132 that is horizontally enlarged in a front-to-rear direction and provided with a downwardly curved top side surface 134 in which a spaced pair of vertical screw holes 136,138 are formed. The tubular body 82 is secured to the handle top side surface 134 by placing a rear bottom side portion of the body 82 on the handle surface 134, extending the Allen screws 94 downwardly through the body top side openings 116 and 117, through the interior of the body 82 and downwardly through the bottom side slot 118 and bottom side hole 124 (see FIG. 13) and then threading the screws 94 into the handle screw holes 136,138. The diameters of the heads of the screws 94 are smaller than the diameters of the body top side holes 116,117 but larger than the diameter of the bottom side hole 124 and the width of the bottom side slot 118. Accordingly, the heads of the screws 94 come to rest on bottom interior side surface portions of the body 82 over its bottom side slot 118 and the bottom side hole 124.

Figure 10:
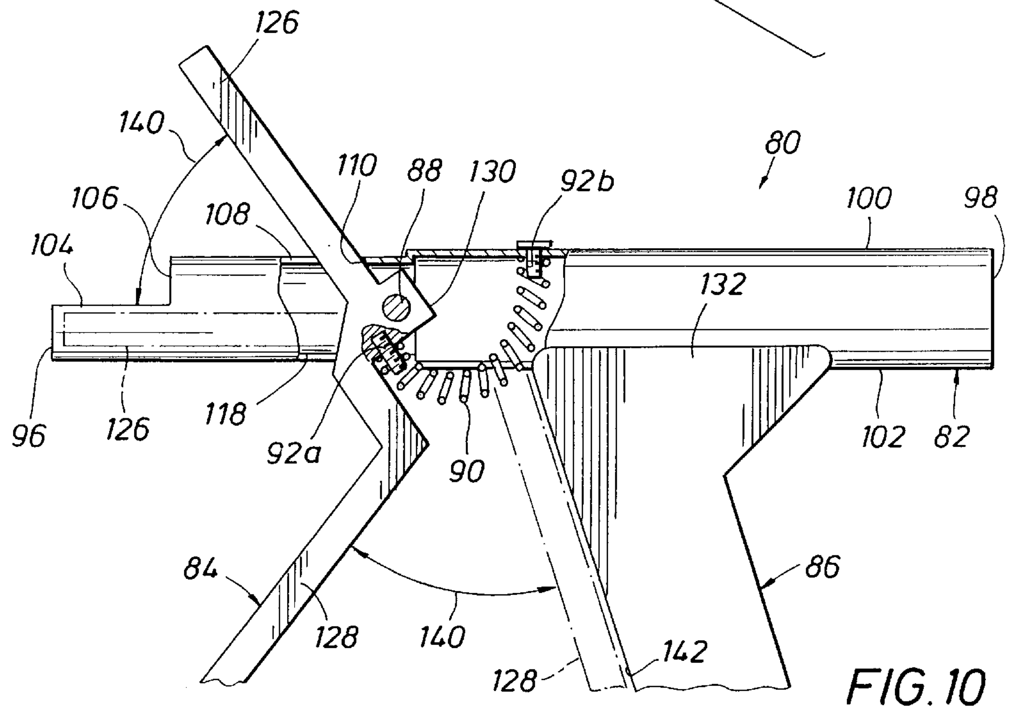
FIG. 10 is a partially cut away, vertically foreshortened side elevational view of the assembled tool.
Figure 11:
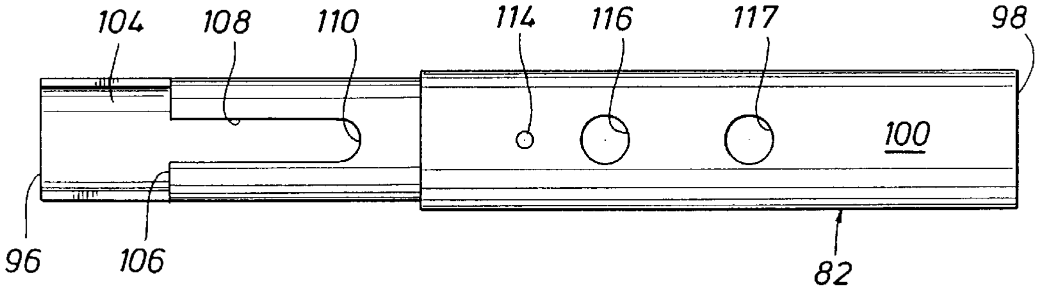
FIG. 11 is a top plan view of a tubular body portion of the tool.
Figure 12:
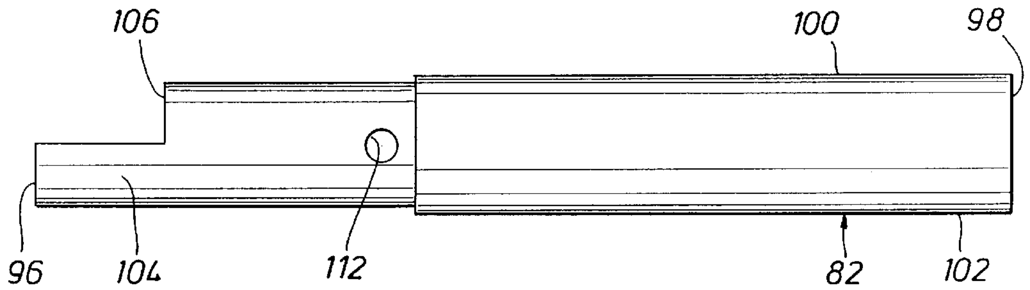
FIG. 12 is a side elevational view of the tool body.
Figure 13:
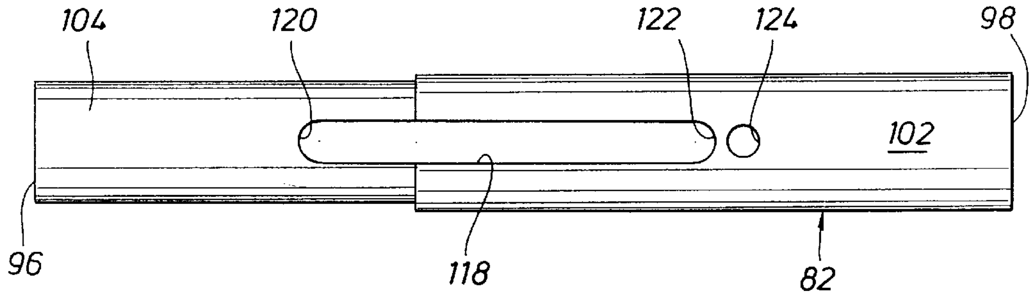
FIG. 13 is a bottom plan view of the tool body.

As best illustrated in FIG. 10, the clamping bar member 84 extends through the interior of the tubular body 82 forwardly of the handle 86, with the clamping arm portion 126 extending outwardly through the body top side slot 108, the mounting block portion 130 disposed within the interior of the body 82, and the trigger arm portion 128 extending outwardly through the body bottom side slot 118. The dowel 88 extends transversely through the interior of the tubular body 82, is rotatable received within the circular opening 131 in the mounting block portion 130, and has opposite ends that are press-fitted into the dowel holes 112 on the opposite right and left sides of the tubular body 82.

This permits the installed clamping bar member 84 to rotate about the dowel 88 relative to the balance of the tool 80, as indicated by the double-ended arrows in FIG. 10, between the solid line first or unclamped position of the bar member 84 shown in FIG. 10 and a dotted line second or clamping position of the bar member also shown in FIG. 10. When the clamping bar member 84 is pivoted from its solid line position to its dotted line position, the clamping arm portion 126 pivots downwardly through the upper body side slot 108 and into the interior of a front end portion of the body 82, and the trigger arm portion 128 pivots rearwardly against the front side 142 of the handle 86.

As best illustrated in FIG. 10, the screw **92*a* has its head portion removed, is threaded into a lower rear side section of the mounting block portion 130 of the clamping bar member 84, and projects rearwardly from the mounting block portion 130. The screw 92*b* is threaded downwardly into the body top side hole 114 and projects downwardly into the interior of the body 82. A left end portion of the compression spring member 90 is telescoped over the outwardly projecting end portion of the screw 92*a*, a right end portion of the spring member 90 is telescoped over the downwardly projecting portion of the screw 92*b*, and longitudinally intermediate portion of the spring member 90 laterally projects downwardly through the body bottom side slot 118. The installed spring member 90 functions to resiliently bias the clamping bar member 84 in a clockwise direction about the dowel 88 toward the solid line position of the clamping bar member 84 in which the engagement of its clamping arm portion 126 with the inner end 110 of the body top side slot 110 stops further clockwise pivotal movement of the clamping bar member 84 relative to the balance of the tool 80**.

Figures 14, 15, 16:
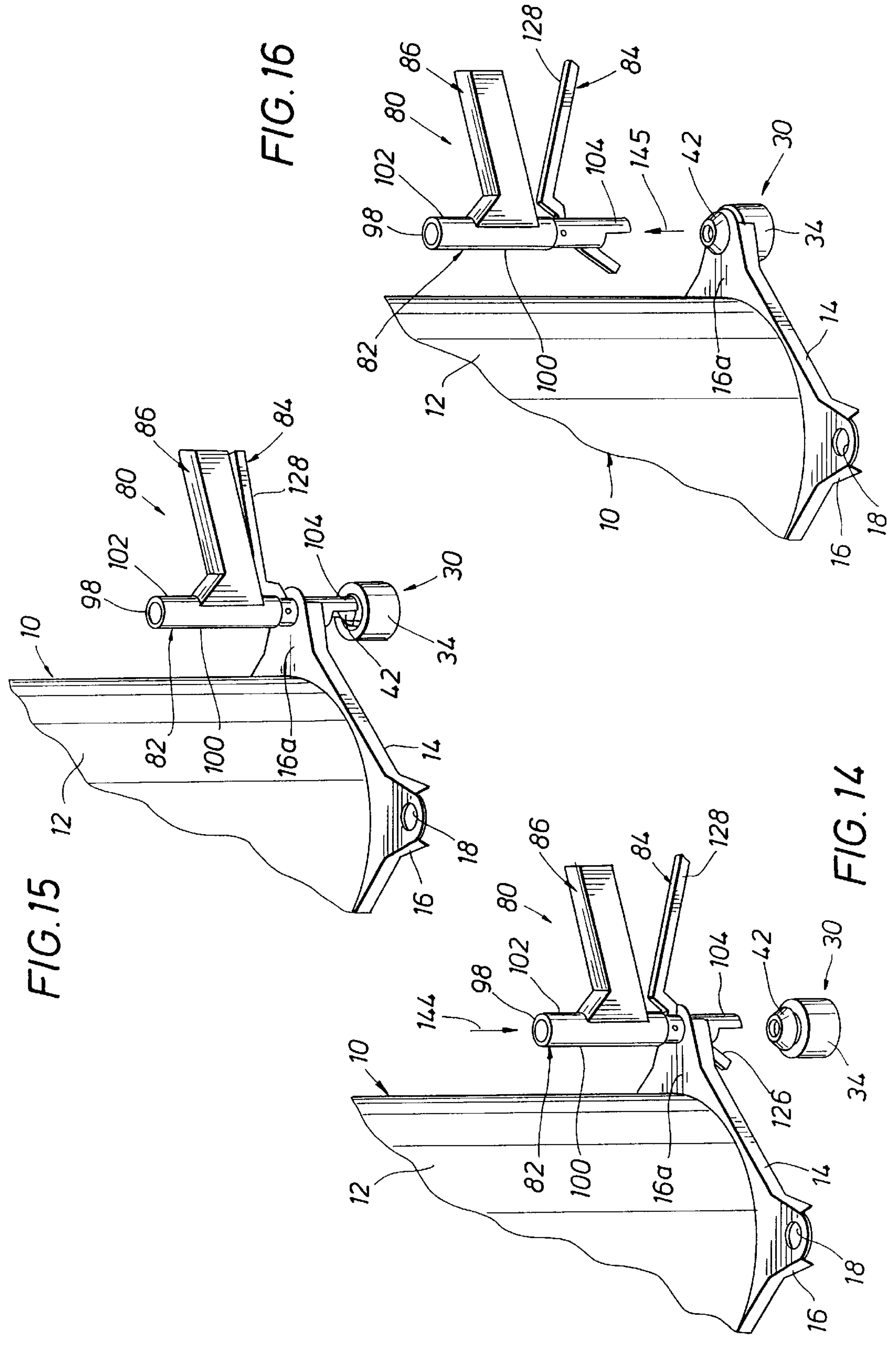
FIGS. 14–16 are reduced scale perspective views of the tool sequentially illustrating its use in installing a resilient mount on a compressor foot.

The unique manner in which the tool 80 is used to install the resilient mount 30 on one of the compressor feet 16, for example the compressor foot **16*a*, will now be described in conjunction with FIGS. 14–18. Referring first to FIG. 14, to start the procedure the operator grasps the tool handle 86 and squeezes the trigger arm portion 128 back toward the handle 86 to bring the clamping bar member 84 to its dotted line second position shown in FIG. 10. Then, as indicated by the arrow 144 in FIG. 14, the arcuate front end portion 104 of the tool body 82 (with the clamping arm portion 126 nested therein) is inserted downwardly through the opening 18 in the compressor foot 16*a* and the trigger arm 128 is released to permit the spring 90 to return the clamping bar member 84 to its unclamped position shown in FIG. 14**.

Figure 17:
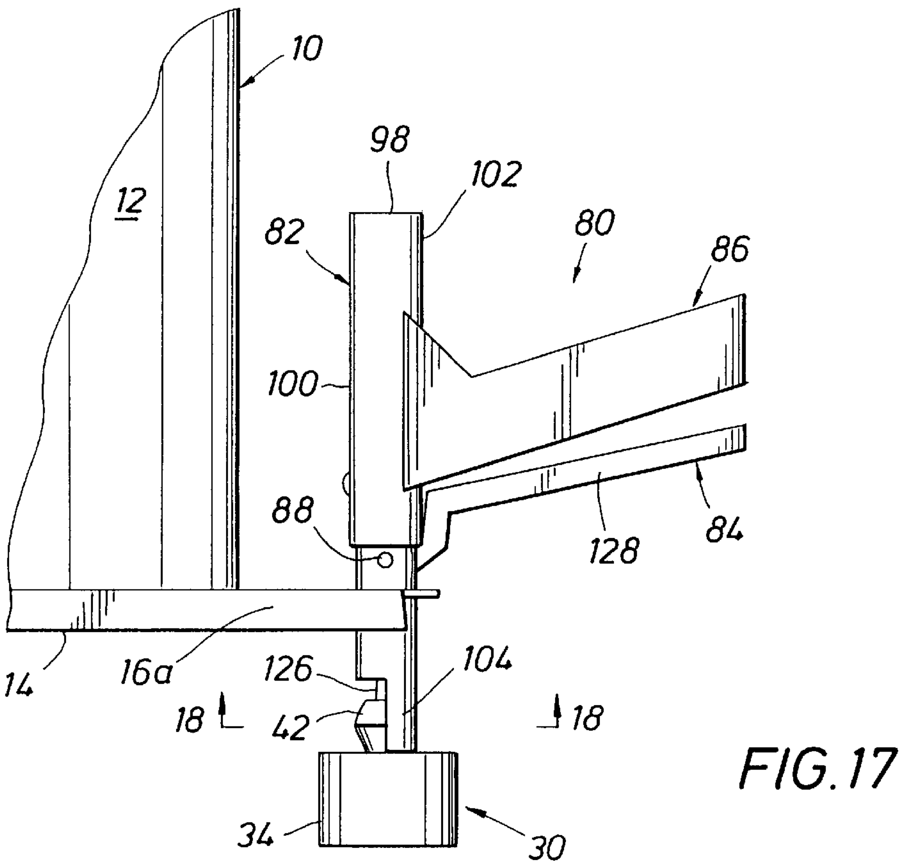
FIG. 17 is an enlarged scale side elevational view of the tool in its FIG. 15 orientation.
Figure 18:
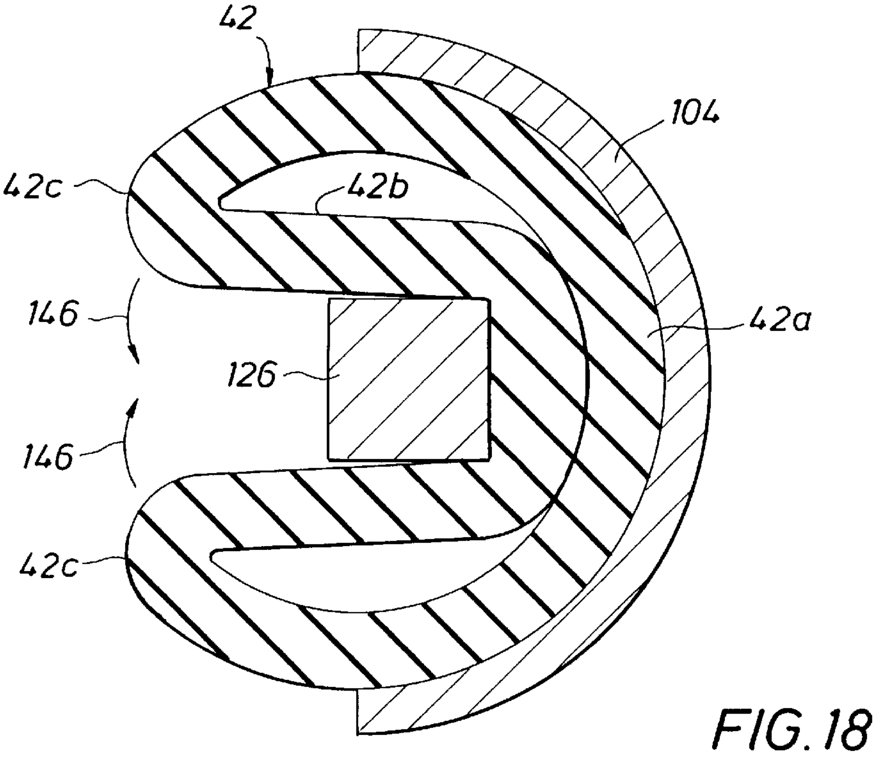
FIG. 18 is an enlarged scale cross-sectional view through the tool, and an upper portion of the compressor mount, taken along line 18—18 of FIG. 17.

Next, a side section **42*a* of the mount head portion 42 is laterally placed in the arcuate body portion 104 (see FIG. 18), and the trigger arm portion 128 is upwardly squeezed to forcibly pivot the clamping arm portion 126 into a central portion of the arcuate body front end portion 104 as shown in FIGS. 15, 17 and 18. This pivoting of the arm portion 126 into the arcuate front body end portion 104 clamps an opposite side portion 42*b* of the resilient mount head portion 42 inwardly against the inner side surface of the mount side portion 42*a* and deforms the mount head portion 42 to a generally U-shaped configuration as cross-sectionally viewed along the longitudinal axis of the resilient mount. The deformed, generally U-shaped resilient mount head portion 42 shown in FIG. 18 has two leftwardly facing outer or free end portions 42*c***.

It should be noted that the arcuate front body portion 104 serves to brace the side portion **42*a* of the mount head 42 generally in its original convex configuration, while the clamping arm portion 126 serves to reverse the curvature of the mount head side portion 42*b* (to a concave curvature from its original convex curvature) and deform the mount head side portion into nesting engagement with the mount head portion 42*a* to impart to the mount head portion 42 its generally U-shaped configuration shown in FIG. 18**.

As shown in FIG. 16, with the mount head section 42 still clamped in its FIG. 18 generally U-shaped configuration by the tool 80, the tool 80 is lifted upwardly away from the top side of the compressor foot **16*a* (as indicated by the arrow 145) to pull the clampingly deformed mount head portion 42 upwardly through the circular hole 18 in the mounting foot 16*a*. The generally U-shaped configuration imparted to the resilient mount head portion 42 by the tool 80 as shown in FIG. 18 facilitates the upward movement of the head portion 42 through the mounting foot hole 18 by permitting side edge portions of the hole 18 to deflect the outer end portions 42*c* of the deformed head portion 42 toward one another, as indicated by the arrows 146 in FIG. 18, in a manner further reducing the cross-sectional area of the deformed mount head portion 42 and permitting its upward passage through the mounting foot hole 18**.

Finally, as indicated in FIG. 16, the trigger arm 128 is released to unclamp the resilient mount head portion 42 and permit it to radially snap back to its original undeformed configuration in which it outwardly overlies a substantial annular top side portion of the mounting foot **16*a* circumscribing its associated circular hole 18 through which the mount head portion 42 was just upwardly passed using the clamping tool 80** of the present invention.

While the tool 18 has been illustrated and described as being used in conjunction with the resilient mount 30, it will be readily appreciated that it also could be used in conjunction with the resilient mount 30*a*. Additionally, while the tool 80 is particularly useful with these specially configured resilient compressor mounts, it will also be appreciated by those of skill in this particular art that the tool could also be used to advantage with conventionally configured resilient mounts having nonconvex annular head portions, as well as with resilient mounts for vibration prone equipment other than compressors.

The foregoing detailed description is to be clearly understood as being given by way of illustration and example only, the spirit and scope of the present invention being limited solely by the appended claims.

What is claimed is:

1. A method of installing a resilient mounting member on an equipment base structure having a circular opening extending between first and second sides thereof, the mounting member having an annular end portion centered about an axis and having a maximum outer diameter greater than the diameter of the circular opening, and an annular outer side surface, said method comprising the steps of:

providing a mounting member installation tool having a clamping portion;

forcibly engaging circumferentially spaced apart outer side surface portions of the mounting member annular end portion with said clamping portion of said tool in a manner laterally and resiliently deforming the end portion to a generally U-shaped configuration bent around the mounting member axis;

axially moving the laterally deformed mounting member end portion, and said clamping portion of said tool engaging it, through the opening from the first side of the base structure to the second side thereof; and disengaging said clamping portion of said tool from the moved and laterally deformed mounting member end portion in a manner permitting it to laterally spring back to its original configuration and overlie the second side of the base structure.

2. The method of claim 1 wherein said method further comprises the step, performed prior to the performance of said forcibly engaging step, of passing said clamping portion of said tool through said opening from said second side thereof to said first side thereof.

3. The method of claim 1 wherein:

said clamping portion of said tool has a first member having a concavely arcuate surface, and a second member supported for selected clamping movement toward and away from said arcuate surface, and said forcibly engaging step is performed by placing said arcuate surface externally against a first outer side surface portion of said annular mounting member end portion and placing said second member externally against a second outer side surface portion of said annular mounting member end portion circumferentially spaced apart from said first outer side surface portion, and then forcibly creating a relative clamping movement between said first and second members to laterally deform said annular mounting member end portion to said generally U-shaped configuration thereof.

4. The method of claim 1 wherein:

the resilient mounting member is a resilient compressor mount, the equipment base structure includes a compressor foot structure in which the circular opening is formed, the circular opening extending between top and bottom sides of the foot structure, and said axially moving step is performed by moving the deformed mounting member end portion through the opening toward said top side of the foot structure.

5. A method Of resiliently supporting a vibration-prone machine having a support portion with a circular opening extending therethrough between first and second sides thereof, said method comprising the steps of:

providing a resilient mounting member having a hollow convex cylindrical head portion centered about a longitudinal axis of said mounting member and having a maximum diameter greater than the diameter of the circular support portion opening;

providing a mounting member installation tool having a clamping portion;

forcibly engaging circumferentially spaced apart outer side surface portions of said head portion with said clamping portion of said installation tool in a manner laterally and resiliently deforming said head portion to a generally U-shaped configuration bent around said longitudinal axis;

axially moving the laterally deformed mounting member head portion, and said clamping portion engaging it, through the opening from the first side of the support portion to the second side thereof; and disengaging said clamping portion of said tool from the moved and laterally deformed mounting member head portion in a manner permitting it to laterally spring back to its original configuration and overlie the second side of said support portion.

6. The method of claim 5 wherein:

said step of providing a resilient mounting member includes the step of configuring said hollow convex cylindrical head portion to have a substantially uniform wall thickness.

7. The method of claim 5 wherein said method further comprises the step, performed prior to the performance of said forcibly engaging step, of passing said clamping portion of said tool through said opening from said second side thereof to said first side thereof.

8. The method of claim 5 wherein:

said clamping portion of said tool has a first member having a concavely arcuate surface, and a second member supported for selected clamping movement toward and away from said arcuate surface, and said forcibly engaging step is performed by placing said arcuate surface externally against a first outer side surface portion of said annular mounting member head portion and placing said second member externally against a second outer side surface portion of said annular mounting member head portion circumferentially spaced apart from said first outer side surface portion, and then forcibly creating a relative clamping movement between said first and second members to laterally deform said annular mounting member end portion to said generally U-shaped configuration thereof.

9. The method of claim 5 wherein:

the resilient mounting member is a resilient compressor mount, the support portion includes a compressor foot structure in which the circular opening is formed, the circular opening extending between top and bottom sides of he foot structure, and said axially moving step is performed by moving the deformed mounting member end portion through the opening toward said top side of the foot structure.

* * * * *

UNITED STATES PATENT AND TRADEMARK OFFICE

CERTIFICATE OF CORRECTION

PATENT NO. : 6,067,700

DATED : May 30, 2000

INVENTOR(S) : Punan Tang, Kenneth R. Swift, Jr. and Ronald J. Rasmussen

It is certified that error appears in the above-indentified patent and that said Letters Patent is hereby corrected as shown below:

Inventors:, Greenwood, all of "Ak." should be all of --Ar.--.

Signed and Sealed this

Tenth Day of April, 2001

Attest:

NICHOLAS P. GODICI

Attesting Officer

*Acting Director of the United States Patent and Trademark Office*